(12) United States Patent
Raab

(10) Patent No.: US 7,287,938 B2
(45) Date of Patent: Oct. 30, 2007

(54) MACHINE TOOL

(75) Inventor: Dieter Raab, Immeldorf (DE)

(73) Assignee: Kennametal Widia GmbH & Co. KG, Essen (DE)

( * ) Notice: Subject to any disclaimer, the term of this patent is extended or adjusted under 35 U.S.C. 154(b) by 0 days.

(21) Appl. No.: 10/523,136

(22) PCT Filed: Jul. 2, 2003

(86) PCT No.: PCT/DE03/02197

§ 371 (c)(1),
(2), (4) Date: Jan. 21, 2005

(87) PCT Pub. No.: WO2004/016379

PCT Pub. Date: Feb. 26, 2004

(65) Prior Publication Data
US 2005/0260045 A1 Nov. 24, 2005

(30) Foreign Application Priority Data
Jul. 26, 2002 (DE) .................. 102 34 030

(51) Int. Cl.
B23B 29/34 (2006.01)
(52) U.S. Cl. .................. 408/153; 408/161; 408/173; 407/37; 407/45
(58) Field of Classification Search ............. 408/153, 408/158, 161, 168, 173, 179, 197; 407/37, 407/45, 46
See application file for complete search history.

(56) References Cited

U.S. PATENT DOCUMENTS

| 3,189,976 | A | * | 6/1965 | Pickril ................... 407/80 |
| 3,232,144 | A | * | 2/1966 | Sweeny .................. 408/153 |
| 3,236,125 | A | * | 2/1966 | Lundgren ................ 408/197 |
| 3,755,868 | A | * | 9/1973 | LaForge et al. ............ 407/75 |
| 3,802,043 | A | * | 4/1974 | Garih .................... 407/36 |
| 4,018,542 | A | * | 4/1977 | Lindsay ................. 408/153 |
| 4,030,176 | A | * | 6/1977 | Michonski ............... 407/107 |
| 4,133,399 | A | * | 1/1979 | Herrmann ............... 175/384 |
| 4,318,647 | A | * | 3/1982 | Erkfritz ................. 408/153 |
| 4,623,284 | A | * | 11/1986 | Greiff .................... 407/38 |
| 4,627,771 | A | * | 12/1986 | Kieninger ................ 407/39 |

(Continued)

FOREIGN PATENT DOCUMENTS

DE 2112689 * 9/1972

(Continued)

Primary Examiner—Monica Carter
Assistant Examiner—Michael W. Talbot
(74) Attorney, Agent, or Firm—Andrew Wilford

(57) ABSTRACT

A machine tool has a rotatable tool holder formed with an outwardly open seat having an outwardly directed floor and a cartridge engaged in the seat, carrying a cutting insert, and formed with an inwardly open groove defining a groove axis and having a surface confronting and extending at a small acute angle to the seat floor. An adjustment wedge axially shiftable in the groove has a formation extending transversely of the axis and bears radially outward on the groove surface and radially inward on the seat floor so that axial shifting of the adjustment wedge radially shifts the cartridge in the groove. An eccentric pin set in the cartridge engages the formation of the adjustment wedge for axially shifting the adjustment wedge in the groove and thereby radially displacing the cartridge in the seat on rotation of the pin.

4 Claims, 5 Drawing Sheets

U.S. PATENT DOCUMENTS

| | | | |
|---|---|---|---|
| 4,784,535 A | 11/1988 | Reinauer | |
| 4,848,977 A * | 7/1989 | Kieninger | 407/39 |
| 4,964,763 A * | 10/1990 | Kieninger | 407/40 |
| 5,031,491 A * | 7/1991 | Hofmann | 82/158 |
| 5,042,733 A * | 8/1991 | Hench | 241/294 |
| 5,163,788 A * | 11/1992 | Dahl et al. | 407/46 |
| 5,454,667 A * | 10/1995 | Cirino et al. | 408/181 |
| 5,529,439 A | 6/1996 | Werner et al. | |
| 5,667,343 A * | 9/1997 | Hessman et al. | 407/36 |
| 5,735,649 A * | 4/1998 | Boscarino et al. | 408/153 |
| 5,863,156 A * | 1/1999 | Satran et al. | 407/36 |
| 5,957,629 A | 9/1999 | Hessmann et al. | |
| 5,967,705 A * | 10/1999 | Wermeister | 407/39 |
| 5,975,811 A * | 11/1999 | Briese | 407/40 |
| 6,378,578 B2 * | 4/2002 | Thomas | 144/230 |
| 6,702,526 B2 * | 3/2004 | Gamble et al. | 407/36 |
| 7,014,393 B2 * | 3/2006 | Matheis | 407/37 |
| 7,114,890 B2 * | 10/2006 | Noggle | 407/36 |

FOREIGN PATENT DOCUMENTS

| | | |
|---|---|---|
| DE | 198 00 440 | 7/1989 |

* cited by examiner

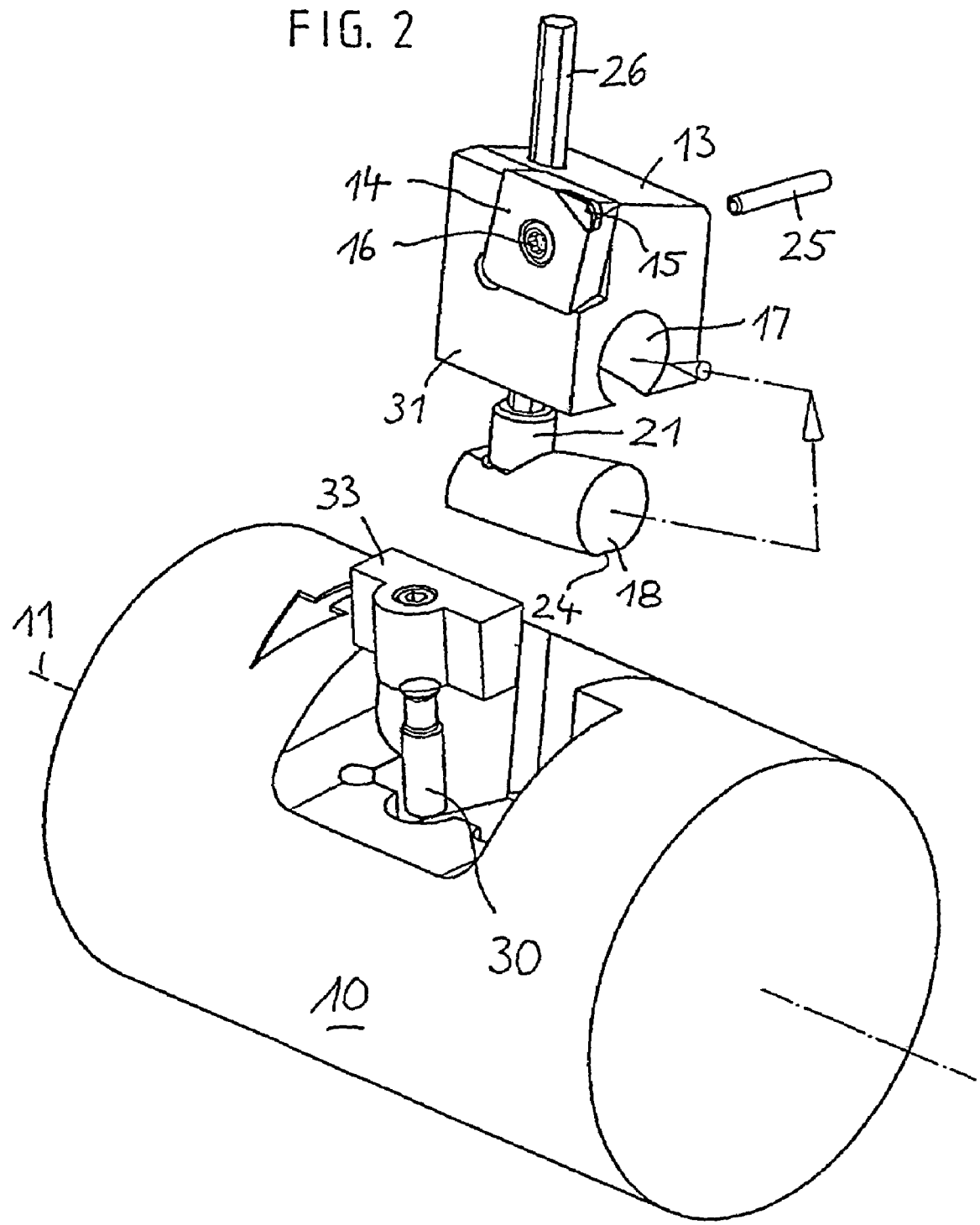

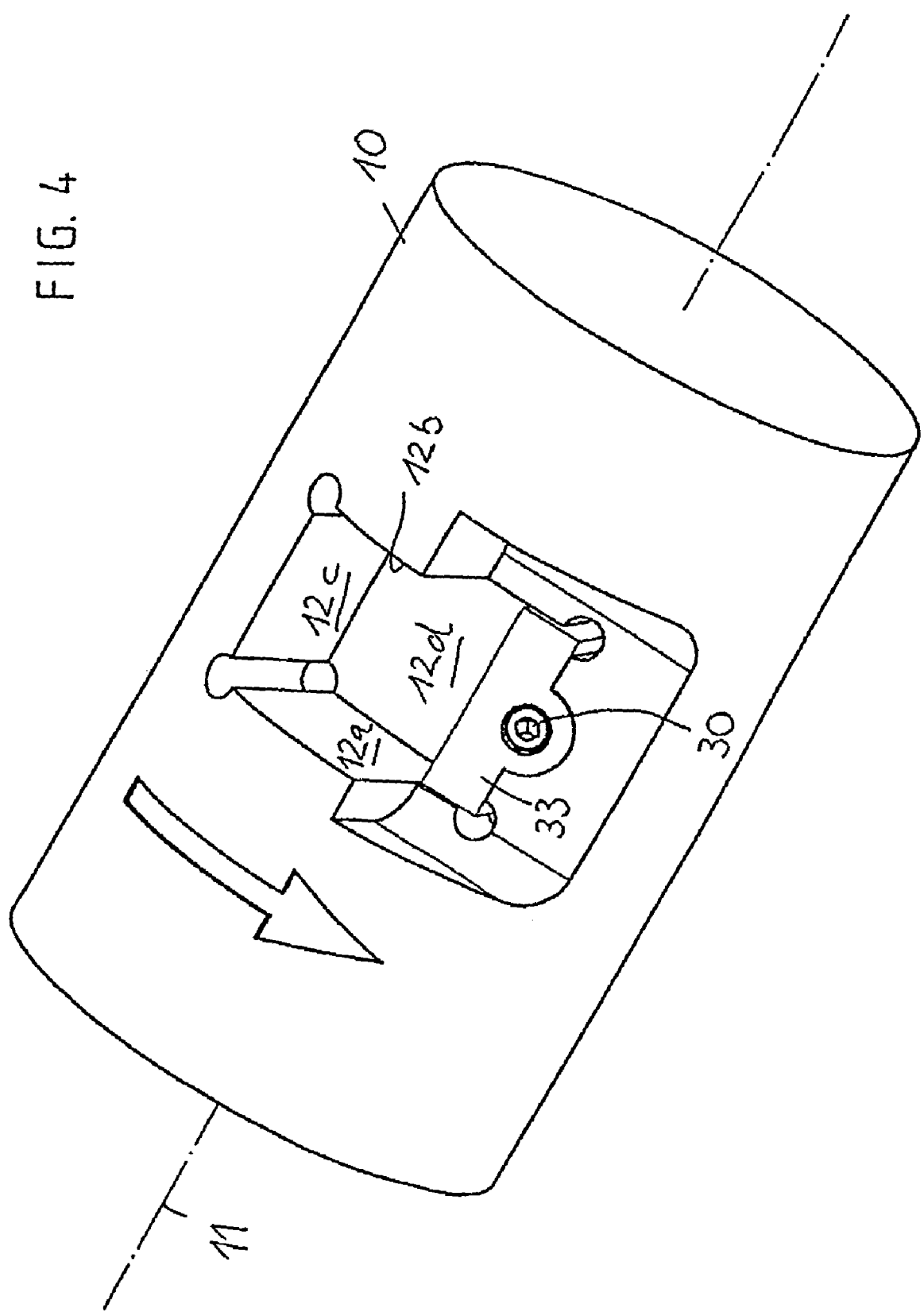

though the cartridge.

MACHINE TOOL

CROSS REFERENCE TO RELATED APPLICATIONS

This application is the U.S. national phase of PCT application PCT/DE2003/002197, filed 2 Jul. 2003, published 26 Feb. 2004 as WO 2004/016379, and claiming the priority of German patent application 10234030.7 itself filed 26 Jul. 2002.

FIELD OF THE INVENTION

The invention relates to a cutting tool for material-removing machining, provided with a tool holder rotatable about an axis and having at least one seat for a cartridge that serves as a tool holder for a cutting insert and with an adjustment device having an eccentric pin for radially shifting the cartridge.

BACKGROUND OF THE INVENTION

A milling tool described in EP 0,739,258 (US equivalent U.S. Pat. No. 5,975,629) has a milling head on whose end face are mounted several cutting inserts each held in a respective cartridge. Each of the cartridges is received in a respective groove in the milling head. The cartridges each have a radial bore in which is provided an eccentric that can be rotated to set the axial position of the cartridge. Once the axial position is set, the cartridge is locked onto the tool head by mounting screws.

Grooves in the periphery of a milling head according to EP 0,697,933 (US equivalent U.S. Pat. No. 5,519,439) hold respective cartridge each holding a cutting insert and a spacer plate. The engaging faces of each cartridge and the respective spacer plate are formed with teeth. In addition a pin engages radially in an opening in the floor of each groove and has a head that is eccentric to the smooth cylindrical shaft of the pin. The eccentric head engages in a recess or throughgoing groove on the back face of the respective cartridge and is formed with a recessed seat so that this pin can be turned. Rotation of the eccentric shifts the respective cartridge axially. A threaded hole in the cartridge receives a screw serving for radial adjustment of the cutting inert or of the cartridge.

OBJECT OF THE INVENTION

It is an object of the present invention to provide for a cutting tool of the above-described type an adjustment mechanism that is different from the prior art and that is easy to use, simple to build, and still capable of extremely fine adjustment of the radial position of the cartridge of the cutting insert fixed to it. Preferably this adjustment mechanism should also be very compact.

SUMMARY OF THE INVENTION

This object is achieved by the cutting tool wherein according to the invention a cartridge groove holds an adjustment wedge that is axially shiftable by means of an eccentric body or pin. As a result of the longitudinal/axial movement of the adjustment wedge in the cartridge, the cartridge is shifted in or out by a travel that is a function of the wedge apex angle, in such a manner that the radial position of the cutting insert can be exactly set even when it is necessary to compensate for tolerance deviations in the dimensionally varying cutting inserts. The eccentric pin serves for radial shifting of the cartridge in both directions, that is radially inward and radially outward, without further equipment.

Preferably the eccentric pin is set in a radial bore of the cartridge, so that a hex key or similar tool can be inserted from outside through an access bore into a seat of the eccentric pin to actuate it. To this end the eccentric pin has an eccentric cylindrical extension that engages in a slot of the adjustment wedge, so that rotation of the eccentric pin shifts the adjustment wedge and thus the cutting edge of the cutting insert radially exactly.

According to a further embodiment the cartridge is retained in the tool holder by a wing wedge that can be locked in place by a screw, preferably a double-thread screw, in the tool holder, the wing wedge bearing when tightened against a cartridge face. This wing wedge serves to lock in the set radial position of the cartridge and those of the cutting insert being used, that is for carrying out a material-removing machining operation.

In order to retain the eccentric pin from dropping out of the cartridge, the eccentric pin is held by a retaining sleeve against radial movement.

The apex angle of the adjustment wedge between 8° and 12°, preferably 10°.

BRIEF DESCRIPTION OF THE DRAWING

Further embodiments of the cutting tool according to the invention as well as its advantages are given in the following with reference to the drawings. Therein:

FIG. 2 is a perspective exploded view of the cartridge with the adjustment wedge;

FIG. 3 is a perspective exploded view of the drill rod with the wing wedge;

FIG. 4 shows the drill rod with the wing wedge installed (without cartridge)

SPECIFIC DESCRIPTION

Figure 1:
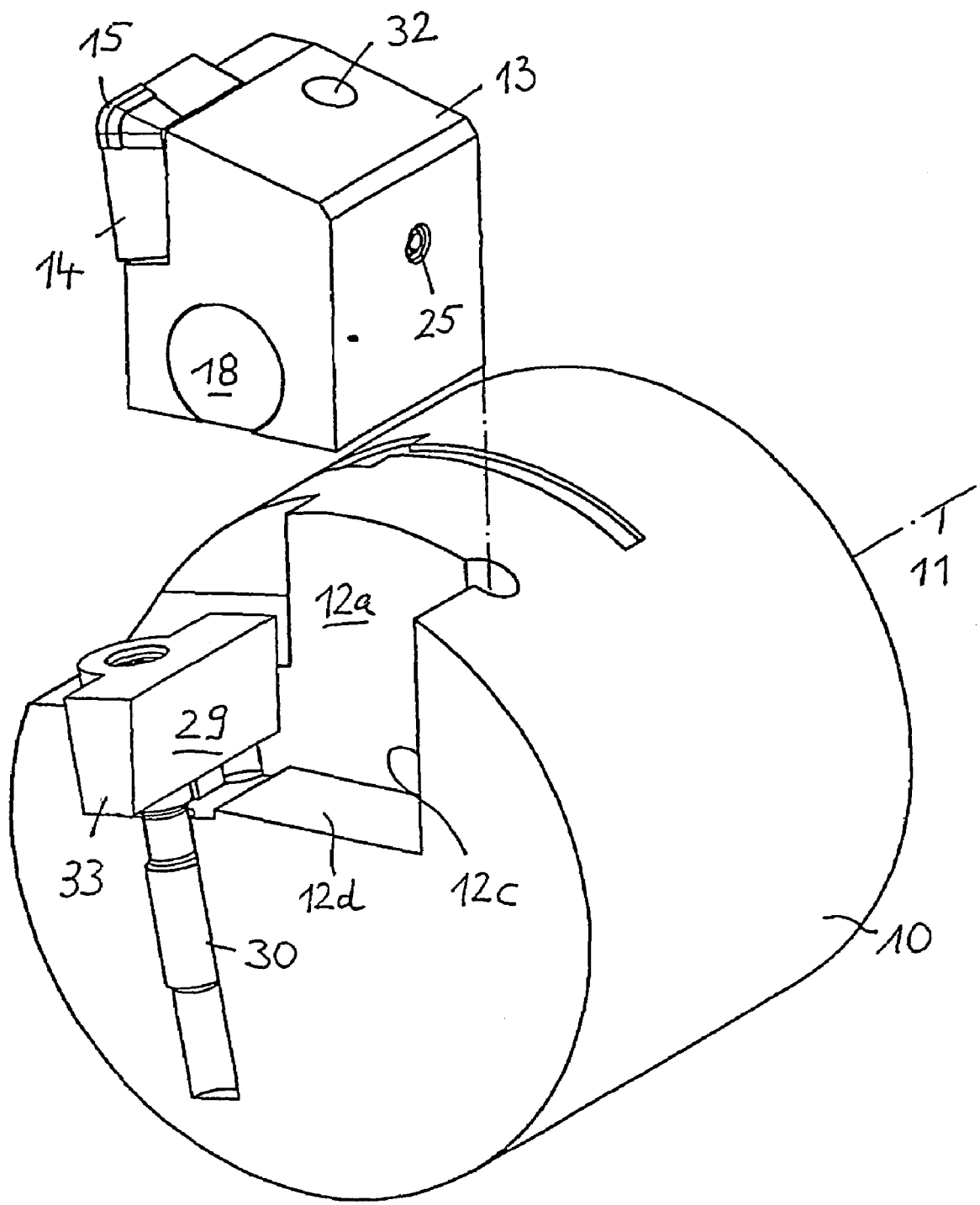
FIG. 1 is a partial section in exploded view through a drill rod with an assembled cartridge.

The present invention, which is described with reference to a drill rod 10 that is rotatable about an axis 11, is mountable in any tool holder rotatable about an axis. The drill rod 10 serving as tool holder here has a seat with side support faces 12a, 12b, and 12c and a floor surface 12d. This seat can receive a cartridge 13 held in place by a wing wedge 33 having a face 29 bearing on a front face 31 of the cartridge 13. The cartridge 13 has a seat holding a cutting insert 14 that has in this case a corner cutting-edge insert 15 of polycrystalline diamond. This cutting insert 14 is secured by a retaining screw 16 in the cartridge 13.

Figures 5, 6:
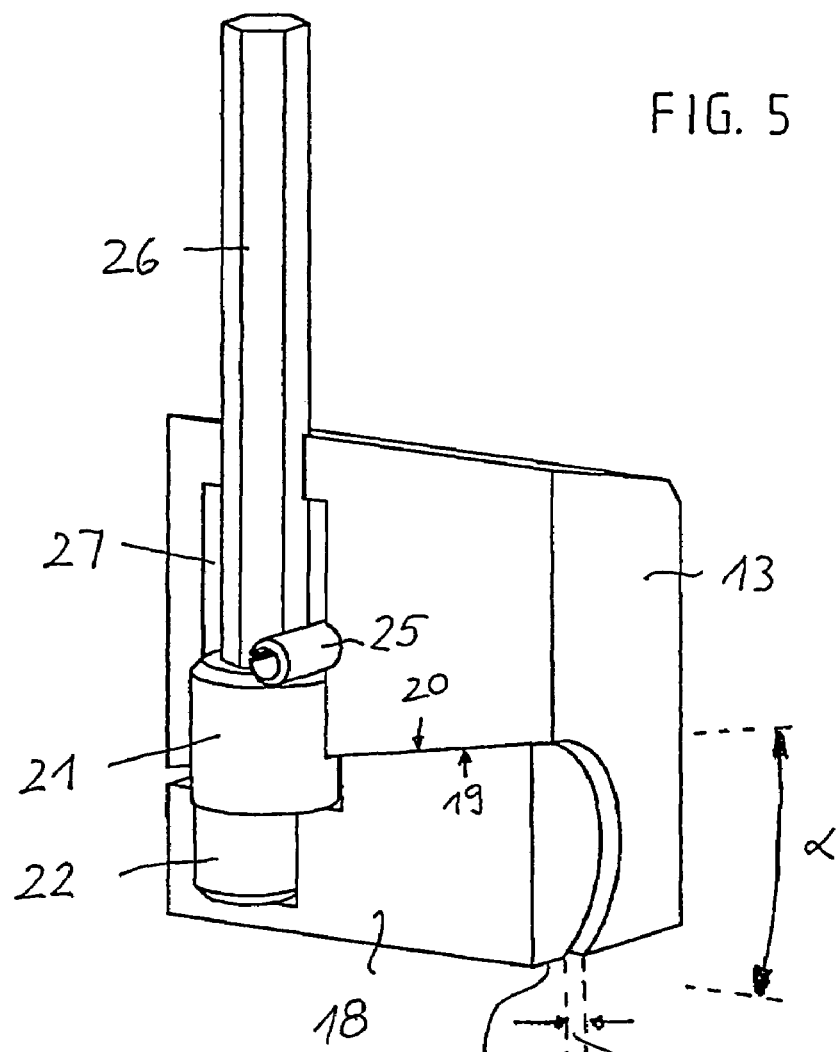
FIGS. 5, 6, and 7 are various perspective sectional views through the cartridge.
Figure 7:
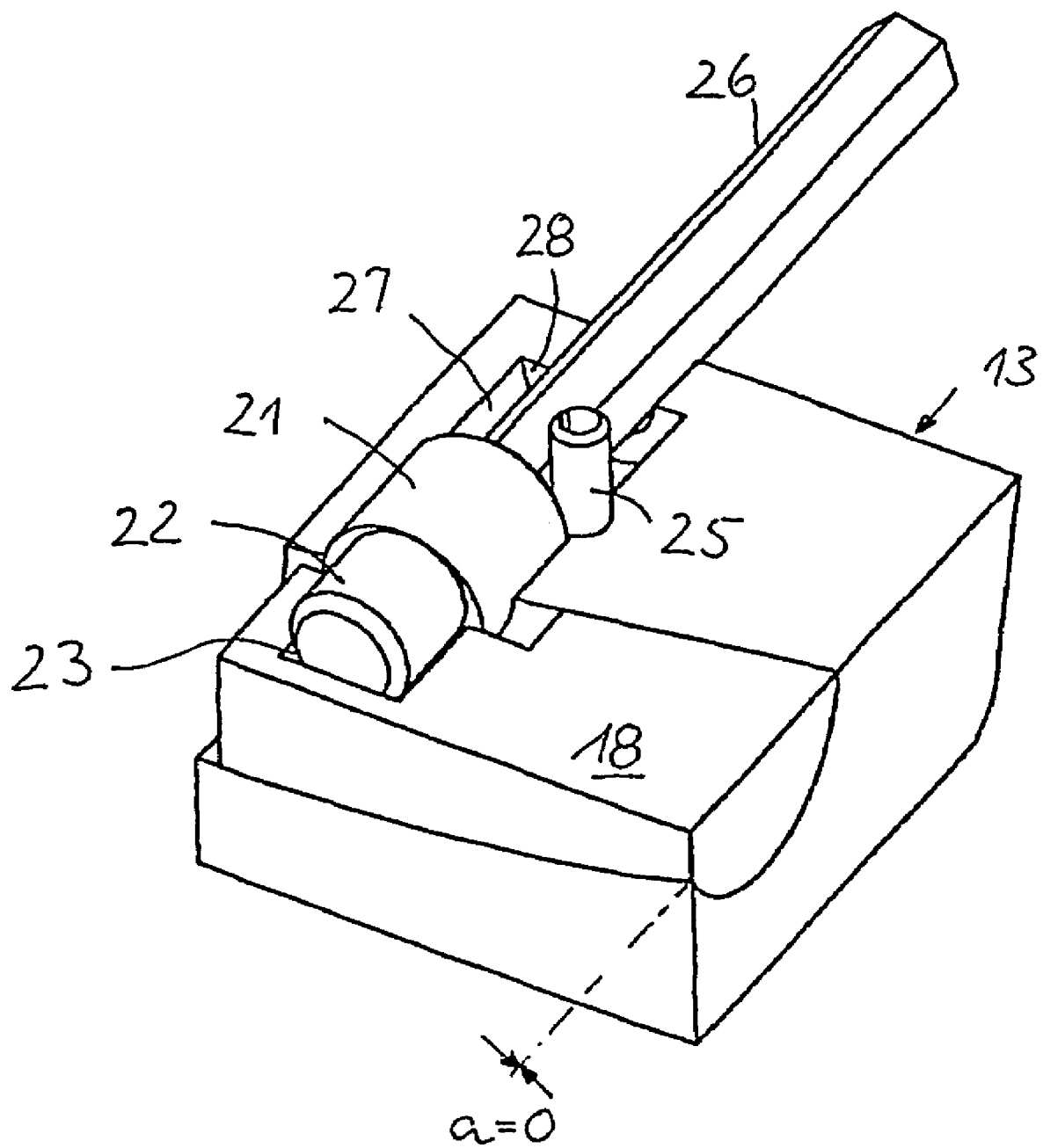

As shown in detail in FIGS. 1, 2, and 5 to 7, a longitudinally extending groove 17 receives an adjustment wedge 18 that can shift in the groove 17 through a travel a. This longitudinal and axial shifting slides a curved inner surface 19 of the cartridge 13 relative to an outer wall surface 20 of the adjustment wedge 18 such that the longitudinal movement of the adjustment wedge 18 relative to the cartridge 13 changes their relative radial positions. FIGS. 6 and 7 show end positions of the cartridge while FIGS. 5 and 6 show the radial outermost position of the cartridge and FIG. 7 the radial innermost position. To axially shift the adjustment wedge 18 there is an eccentric pin 21 set in a radial bore in the cartridge 13. This eccentric pin 21 has an eccentric cylindrical extension 22 that engages in a slot 23 in the adjustment wedge 18. Rotation of the eccentric pin 21 shifts the axial position of the cylindrical extension 22 so that the adjustment wedge 18 is shifted axially in the cartridge 13. The adjustment wedge 18 bears with a flat 24 on the floor face 12d while the cartridge 13 is movable radially through a travel that is a function of the axial travel a and a wedge angle α. FIGS. 5 and 6 show different views illustrating the maximum cartridge radial movement for axial shifting through the travel a. If the travel a is equal to 0 (see FIG. 7) the cartridge 13 is raised minimally.

A retaining sleeve 25 prevents radial dropping-out, being driven into place after assembly of the cartridge 13 with the adjustment wedge 18 and the eccentric pin 21.

A hex wrench 26 is inserted through a port 32 (FIG. 1) into a hex recess of the eccentric pin 21 to actuate it.

To assemble the cartridge shown in FIG. 1, first the eccentric pin 21 is inserted into the radial bore 27 to engage an end face 28 thereof. Then the adjustment wedge 18 is slid into its groove 17 in the cartridge 13 until the slot 23 of the adjustment wedge 18 is aligned with the cylindrical extension 22 whereupon the eccentric pin 21 and its extension 22 are pushed downward as shown in FIGS. 5 and 7. The retaining sleeve 25 is then fitted in place so as to lock the cartridge 13, the adjustment part 18, and the eccentric pin 21 relative to each other. The cartridge 13 can now be fitted into the seat of the drill rod 10 and secured in place by the wing wedge 33, which wing wedge 33 can be actuated by a double-threaded screw 30 to clamp the cartridge 13 via its front face 31. Radial adjustment of the cartridge 13 with the cutting insert 14 and its cutting edge 15 is possible when the clamping pressure exerted by the wing wedge 33 is only slight. When the hex tool 26 is fitted into the bore 27 and set in the seat of the eccentric pin 21, this eccentric pin 21 can be rotated so as to axially shift its eccentric extension 22 and thereby move the adjustment wedge 18 axially between an axial position with a=0 (FIG. 7) to the position of FIGS. 5 and 6 with a=2 to 3 mm. The mutually engaging slide surfaces 19 and 20 of the wedge 18 and cartridge 13 permit radial movement so that a radial fine adjustment of the cutting edge 15 of the cutting insert 14 is possible. After the optimal radial position of the cartridge 13 has been established, actuation of the double-threaded screw 30 pulls in the wing wedge 33 and clamps the cartridge 13 in place.

It is particularly advantageous with the system of this invention that the radial position of the cartridge 13 can easily be adjusted by radially inserting the hex wrench 26 or another screwdriver.

The invention claimed is:

1. A cutting-tool assembly comprising:
   a rotatable tool holder formed with an outwardly open seat having an outwardly directed floor;
   a cartridge engaged in the seat, carrying a cutting insert, and formed with
     an inwardly open groove defining a groove axis and having a substantially cylindrical surface confronting and extending at a small acute angle to the seat floor and
     a radially extending bore opening into the seat;
   an adjustment wedge axially shiftable in and shaped generally complementarily to the groove, having a formation extending transversely of the axis, and bearing radially outward on the groove surface and radially inward on the seat floor, whereby axial shifting of the adjustment wedge radially shifts the cartridge in the groove;
   means including an eccentric pin seated and rotatable in the bore and engaging the formation of the adjustment wedge for axially shifting the adjustment wedge in the groove and thereby radially displacing the cartridge in the seat on rotation of the pin;
   a retaining element removably received in the cartridge and projecting radially into the bore outward of the formation of the pin;
   a retaining body; and
   means for pressing the retaining body against the cartridge generally parallel to the seat floor and thereby locking the cartridge against displacement in the seat.

2. The cutting-tool assembly defined in claim 1 wherein the formation is a transverse groove in the adjustment wedge and the eccentric pin has a cylindrical end extension engaged in the transverse groove.

3. The cutting-tool assembly defined in claim 1 wherein the angle is between 8° and 12°.

4. The cutting-tool assembly defined in claim 1 wherein the seat floor is flat and the wedge has a flat face riding on the seat floor.

* * * * *